United States Patent [19]

Dabi et al.

[11] 4,447,571
[45] May 8, 1984

[54] STABILIZATION OF POLYURETHANES

[75] Inventors: Shmuel Dabi, Fair Lawn; Peter Loewrigkeit, Wyckoff, both of N.J.

[73] Assignee: Witco Chemical Corporation, New York, N.Y.

[21] Appl. No.: 311,588

[22] Filed: Oct. 15, 1981

Related U.S. Application Data

[63] Continuation-in-part of Ser. No. 138,761, Apr. 9, 1980, abandoned.

[51] Int. Cl.³ .............................................. C08K 5/24
[52] U.S. Cl. .................................... 524/192; 524/191; 524/193; 524/194; 525/509; 528/44; 528/85
[58] Field of Search ............... 524/191, 591, 192, 193, 524/194; 528/44, 85

[56] References Cited

U.S. PATENT DOCUMENTS 3,188,302  6/1965  Lorenz et al. ........................ 528/63
3,923,713 12/1975  Hermann ............................. 524/591
3,929,726 12/1975  Schollenberger et al. ......... 524/191

*Primary Examiner*—J. Ziegler
*Attorney, Agent, or Firm*—Wallenstein, Wagner, Hattis, Strampel & Aubel

[57] ABSTRACT

A process for providing water based anionic polyurethanes having improved thermal oxidation color stability. Water dispersed amine salts of anionic prepolymers prepared from the reaction of polyhydroxy compounds and dihydroxy carboxylic acids with diisocyanates are chain-extended with hydrazine or hydrazide and thereafter optionally with a diamine, when cured at temperatures in excess of 150° C., form polyurethane products having substantially no discoloration and good mechanical properties. Alternately, the hydrazide may be employed as an additive rather than as a chain-extender. The process is particularly useful when employing cross-linking agents which react only at high temperatures.

4 Claims, No Drawings

STABILIZATION OF POLYURETHANES

This is a continuation-in-part of copending application Ser. No. 138,761, filed on Apr. 9, 1980, abandoned.

FIELD OF THE INVENTION

This invention relates to improvements in water based anionic polyurethanes. Specifically, this invention relates to improved thermal color stabilization of these polyurethanes.

BACKGROUND AND DISCUSSION OF PRIOR ART

Heretofore, when high curing temperatures of about 150° C. or higher were employed to effect rapid curing, and often gain better mechanical properties and solvent-resistance of aqueous dispersion anionic polyurethanes, the product would become discolored. When discoloration posed a problem, high temperature curing was avoided.

It was known to employ chain extenders in forming water-dispersible polyurethanes such as is disclosed in U.S. Pat. No. 3,432,456 issued to Oertel et al. on Mar. 11, 1969 and U.S. Pat. No. 3,475,377 issued to Rosendahl et al. on Oct. 28, 1969. It was not known, however, that aqueous dispersion of anionic polyurethanes could be cured at these high temperatures of over 150° C.

Other related art includes U.S. Pat. No. 3,149,998 issued to Roland. J. Thurmaler on Sept. 22, 1964, discloses the use of hydrazides, semicarbazides and their analogs for the color-stabilization of polyurethanes at ordinary temperatures significantly below 150° C., and not with the present anionic polyurethanes; U.S. Pat. No. 4,147,679 issued to Scriven et al. on Apr. 3, 1979, discloses the use of hydrazines and hydrazides as chain-extenders at low temperatures to improve polyurethane characteristics such as flexibility, hardness, drying, and coating properties; U.S. Pat. No. 3,415,768 issued to Dieterich et al. on Dec. 10, 1968, relates to the low temperature cure of polyisocyanates in combination with diamines such as ethylene diamine and/or alternatively hydrazine as chain-extenders so as to increase mechanical strength and resistance to solvents; and Reiff et al. in U.S. Pat. No. 3,920,598 issued on Nov. 18, 1975, discloses nonionic polyurethanes which are not necessarily suseptable to discoloration at high temperatures. All the foregoing patents are incorporated herein by reference.

It is a principle object of the present invention to provide water based polyurethanes which have high thermal oxidative color stability and yet which also have good physical and mechanical properties.

It is another object of the present invention to provide highly useful water-dispersible anionic polyurethanes which are cured more rapidly by employing high temperatures, particularly when cross linking agents are employed.

It is still a further object of the present invention to provide a process for preparing the aforesaid polyurethanes which is readily and inexpensively performed and practical in commercial utilization.

DESCRIPTION OF THE PREFERRED EMBODIMENT

Broadly speaking, the present invention comprises the formation of anionic polyurethanes from the corresponding pre-polymers by adding one, or a combination of, hydrazine or an organohydrazide wherein with high temperature cure, the product has both good thermal oxidative color stability as well as good mechanical properties. Because hydrazine is difficult to handle, the hydrazides are preferred in the present process.

In a more specific sense this present invention is a process for providing a thermally oxidative stabilized polyurethane which comprises treating an NCO terminated anionic prepolymer with a compound selected from hydrazine and an organohydrazide, and a polyamine, preferably a diamine, and high heat curing same to form the polyurethane product. Alternately, the hydrazide can be an integral part of the anionic prepolymer, as known in the art.

In another aspect, the present invention comprises formation of polyurethanes from a water-dispersed anionic prepolymer by adding as a chain extender either hydrazine or a hydrazide with or without a diamine, a cross-linking agent which is activated at temperatures above about 150° C., and then fast curing at high temperatures to provide a product which has both good thermal oxidative color stability as well as good physical and mechanical properties.

By "anionic polyurethane" is meant a polyurethane with a pendant acid capable of forming an anionic polyurethane as described below. In the present process the hydrazine or hydrazide treated polyurethane is neutralized and rendered anionic with a volatile organic base such as the volatile alkyl and alkanol tertiary amines which vaporize at below about 150° C., such as triethylamine, N-methyl morpholine, N,N-dimethyl propanolamine, N-methyl diethanolamine, and others, as known in the art. The volatile base is driven off during the high temperature curing step.

The acid component on the present anionic polyurethanes is derived from the corresponding polyhydroxy carboxylic acid such as dimethylolpropionic acid, glyceric acid, tartaric acid, saccharic acid, trishydroxymethyl acetic acid, the adduct of glycerol and succinic anhydride, the adduct of trimethylol propane with maleic anhydride and the like as is known in the art.

It is a feature of the present invention that the presence of hydrazine or a hydrazide in the aqueous suspension of the anionic prepolymer results in color thermostability of the polyurethane. Curing is rapidly effected by the present process over a period of about 10 minutes and up to about 60 minutes without deleterious effect.

It was also surprisingly found that by first including a hydrazide in the polyurethane prepolymer, and then subsequently adding a diamine, a highly thermal oxidative color-stable polyurethane is formed having good mechanical properties, and most preferably then adding a high temperature cross-linking agent, before curing at temperatures above about 150° C. It is an advantage of the present process that these high temperature-activated cross-linking agents are employable to produce a product which does not discolor.

Generally, monohydrazides are useful as additives and polyhydrazides as chain-extenders. In the absence of a reactor NCO group, however, the polyhydrazides would also behave as additives. Included among the hydrazides useful in the present invention are:

| | |
|---|---|
| R—CO—NH—NH$_2$ | (Additive) |
| dihydrazides having the formula: | (Chain Extender |
| NH$_2$—NH—CO—NH—NH$_2$ | or Additive) |
| polyhydrazides having the formula: | (Chain Extender |
| R(—CO—NH—NH$_2$)$_n$ | or Additive) |

| -continued | |
|---|---|
| semicarbazides having the formula:<br>R—NH—CO—NH—NH$_2$ | (Additive) |
| thiohydrazides having the formula:<br>R—CS—NH—NH$_2$ | (Additive) |
| bisthiohydrazides having the formula:<br>NH$_2$—NH—CS—R—CS—NH—NH$_2$ | (Chain Extender<br>or Additive) |
| polythiohydrazides having the formula:<br>R(—CS—NH—NH$_2$)$_n$ | (Chain Extender<br>or Additive) |
| and thiosemicarbazides having the formula:<br>R—NH—CS—NH—NH$_2$ | (Additive) |

In the above formulae, the monovalent R groups may be hydrogen (except in the hydrazides and thiohydrazides) or an organic monovalent group. The subscript "n" is an integer greater than 2. The organic radicals may be aliphatic, cycloaliphatic, aromatic, or heterocyclic and, for practical purposes, contain from 1 to about 18 carbon atoms, but the limitation of 18 carbon atoms is not considered to be critical for the purpose of this invention. Obviously, the R groups must be free of substituents which are reactive with the —CX—NH—NH$_2$ group wherein X=S or O, such as nitro, nitroso, and, chloramine groups. Compounds in which X is oxygen are more effective than the corresponding compounds in which X is sulfur and, therefore, preferred as a class.

Specific examples of these hydrazides are the monohydrazides of acetic and propionic acids, for instance; the dihydrazides of oxalic, adipic, diglycolic and sebacic acids; and the polyhydrazides obtained by the reaction of methacrylate and acrylate homopolymer and copolymers with hydrazine to yield a large molecule having a carbon backbone and pendant,

—CO—NH—NH$_2$ groups; semicarbazide, butyl semi-carbazide, heptyl semicarbazide, octadecyl semicarbazide, asymmetrical diphenyl semicarbazide; thiocarbohydrazide; alkyl thiosemicarbazide, heptyl thiosemicarbazide, and phenyl thiosemicarbazide. Other useful hydrazides and carbazides are disclosed in Clark, Charles C., "Hydrazine," Matheson Chemical Corp., Baltimore, MD. (1953).

The amines which can be employed in the preparation of the urethanes of the invention can be primary or secondary diamines or polyamines, the diamines and triamines being preferred. They can be saturated or unsaturated, aliphatic, alicyclic, aromatic, aromatic-substituted aliphatic, aliphatic-substituted aromatic, or heterocyclic. Mixed aromatic and aliphatic amines can be employed and other non-active groups can be present attached to the carbon atom, such as oxygen, sulfur, halogen or nitroso. Exemplary of suitable aliphatic and alicyclic diamines are the following: 1,2-ethylene diamine, diethylene triamine, triethylene tetramine, 1,2-propylene diamine, 1,6-hexamethylene diamine, isophorone diamine, propane-2,2-dicyclohexyl-amine, methane bis-(4-cyclohexyl)amine, and

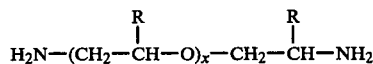

where x=1 to 10 and R=H or lower alkyl.

Aromatic diamines such as o-phenylene diamine and p-tolylene diamine can also be employed.

Suitable cross-linking agents useful in the present invention are those which are effective at temperatures above at least about 150° C. Examples of such high temperature cross-linking agents include the methoxymethylolated melamines such as the Cymel agents ("Cymel" is a registered trademark of American Cyanamid, Stamford, Conn.), methoxymethylolated urea; methoxymethylolated benzoguanamine; methoxymethylolated glycoluril and the blocked isocyanates, as known in the art. The water-dispersed polyurethane latex containing hydrazine or hydrazide in conjunction with a cross-linking agent when cured at temperatures above 150° C. produce thermal stable film with good mechanical properties and good solvent resistance.

To prepare the polyurethanes, any polyisocyanate may be used both aliphatic and aromatic, as known in the art, such as, m-phenylene diisocyanate, p-phenylene diisocyanate, polymethylene polyphenylisocyanate, 2,4-toluene diisocyanate, 2,6-toluene diisocyanate, dianiside diisocyanate, bitolylene diisocyanate, naphthalene-1,5-diisocyanate, xylylene-1,3-diisocyanate bis(4-isocyanatophenyl) methane, bis(3-methyl-4-isocyanatophenyl) methane, 4,4'-diphenylpropane diisocyanate, isophorone diisocyanate, hexamethylene diisocyanate, methylene bis(cyclohexyl) diisocyanate, and triisocyanates, as known in the art.

The polyhydroxyl compounds or polyols can be either low or high molecular weight materials and, in general, will have average hydroxyl values as determined by ASTM designation E-222-67, Method B, between about 1000 and 10, and preferably between about 500 and 25. The term "polyol" is meant to include materials having the average of two or more hydroxyl groups per molecule and includes low molecular weight diols, triols, and di- and tri-functional higher alcohols, low molecular weight amide containing polyols and higher polymeric polyols such as polyester polyols, polyether polyols, and hydroxy-containing acrylic interpolymers.

The low molecular weight difunctional alcohols useful in the instant invention have hydroxyl values of 200 or above, usually within the range of 1500 to 200. Such materials include aliphatic polyols, particularly alkylene polyols containing from 2 to 18 carbon atoms. Examples include ethylene glycol, 1,4-butanediol, 1,6-hexanediol; cycloaliphatic polyols, such as 1,2-cyclohexanediol and cyclohexane dimethanol. Examples of trifunctional, and higher alcohols include trimethylol propane, glycerol and pentaerythritol. Also useful are polyols containing ether linkages such as diethylene glycol and triethylene glycol and oxyalkylated glycerol. Mixtures of the foregoing may be employed as known in the art.

When flexible and elastomeric properties are desired, the partially reacted NCO-containing polymer should preferably contain at least a portion of a higher molecular weight polymeric polyol. Such a polymeric polyol should be predominantly linear to avoid gelling of the resultant polymeric product and should have a hydroxyl value of 250 or less, preferably within the range of about 150 to 25.

Any suitable polyalkylene ether polyol may be used such as those having the following structural formula:

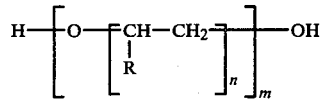

where the substituent R is hydrogen or lower alkyl including mixed substituents, and n is typically from 2 to 6 and m is from 2 to 100 or even higher. Included are poly(oxytetramethylene) glycols, poly(oxythylene) glycols, polypropylene glycols and the reaction product of ethylene glycol with a mixture of propylene oxide and ethylene oxide.

Also useful are polyether polyols formed from the oxyalkylation of various polyols, for example, glycols such as ethylene glycol, 1,6-hexanediol, Bisphenol A, and the like, or higher polyols, such as trimethylol propane, pentaerythritol and the like. Polyols of higher functionality which can be utilized as indicated can be made, for instance, by oxyalkylation of compounds such as sorbitol or sucrose.

Besides poly(oxyalkylene) glycols, any suitable polyhydric polythioether may be used, for example, the condensation product of thioglycol or the reaction product of a polyhydric alcohol, such as disclosed herein for the preparation of hydroxyl polyesters, with thioglycol or any other suitable glycol.

A polyester polyol can be employed as a polymeric polyol component in the practice of the invention. Usually, the polycarboxylic acids and polyols are aliphatic or aromatic dibasic acids and diols. The above mentioned diols are employed in making the polyester, as is well known in the art.

The acid component of the polyester preferably consists primarily of dicarboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types. Larger amounts of a monobasic acid such as benzoic acid may be combined with sucrose to make effectively difunctional sucrose pentabenzoate. Also, there may be employed higher polycarboxylic acids such as trimellitic acid and tricarballylic acid, where acids are referred to above, it is understood that the anhydrides of those acids which form anhydrides can be used in place of the acid. Also, lower alkyl esters of acids such as dimethyl glutarate can be used. It is preferred that the polyester include an aliphatic dicarboxylic acid as at least part of the acid component.

EXAMPLE I

A sample containing 199 gr. poly(hexane diol adipate), OH No. 112, was melted at 80° C., and then 24.6 gr. dimethylol propionic acid, 152 gr. 4,4' di-(isocyanato cyclohexyl)-methane were added and the temperature was reduced to 60° C. To this mixture 18.6 gr. triethylamine and 96.3 gr. acetone were added and the mixture was stirred at 65° C. for 4 hours, to give a prepolymer containing 3.3% NCO. The prepolymer was dispersed in 750 gr. water and chain extended with 11 gr. ethylene diamine. After 1 hour at room temperature, acetone was stripped under reduced pressure. A film cast of the polymer was exposed to 185° C. in a blower oven. It turned yellow after 10 min. and continued to brown after 20 min. In contrast when 0.25% weight percent (based on weight of prepolymer) of carbohydrazide was added to the latex, discoloration was completely prevented. With longer periods of heating, more carbohydrazide was needed. When the sample was cured for 45 min. at 185° C., then 1.5% carbohydrazide was required to stabilize the polymer against thermal oxidative discoloration.

Equal success in preventing discoloration was obtained using any carbohydrazide ($-C-NHNH_2$) group containing compound, such as: semicarbazide hydrochloride, adipic acid dihydrazide, diglycolic acid dihydrazide, etc. Stabilizers containing carbohydrazide groups were prepared as well as by reacting hydrazine with isocyanates, lactone and carbonates.

As a further example, 12 gr. phenylisocyanate and 2.9 gr. hydrazine hydrate (85%) were mixed in a cool bath, an exothermic reaction took place. Then 1 gr. of the solid product was mixed in 100 gr. latex to produce good thermal oxidative stability in the product.

EXAMPLE II

A sample containing 150 gr. polypropylene glycol (100 mw), 20.1 gr. dimethylolpropionic acid and 88.7 gr. TDI were stirred at 80° C. for 4 hr. The resulting prepolymer was dispersed in 500 gr. water containing 15.1 gr. triethylamine and 10 gr. oxalic acid dihydrazide. The polymer was stable and did not discolor upon heating as first described in Example I. In the absence of dihydrazide (using only water as chain extender) the polymer discolored badly when simultaneously heated. Equally good results were obtained using hydrazine hydrate as well as adipicdihydrazide and carbohydrazide.

EXAMPLE III

A sample containing 8.6 gr. γ-butyrolactone and 2.9 gr. hydrazine hydrate (85%) was mixed at room temperature. After 1 hour it solidified and the water was removed by stripping. The solid product was mixed with 50 gr. poly(hexanediol adipate) of OH No. 112, 52.8 gr. 4,4'-methylene bis cyclohexyl isocyanate, 6.7 gr. dimethylol propionic acid, 10.1 gr. triethyl amine and 30 gr. acetone. The mixture was stirred at 65° C. for 4 hr. and then dispersed in 245 gr. water containing 3 gr. ethylenediamine. The product was then cured under similar conditions as in the previous examples.

EXAMPLE IV

The NCO terminated polyurethanes when chain extended by diamine/dihydrazide combination, showed better mechanical properties than those chain extended by only diamine or dihydrazide. Prepolymers were prepared as described in Example I, and chain extended with: (1) 11 gr. ethylene diamine (EDA); (2) 17 gr. carbohydrazide, and (3) 5 gr. EDA and 8.5 gr. carbohydrazide. The following mechanical properties were obtained:

| No. | Tensile Strength psi | Modules at 100% Elongation, psi |
| --- | --- | --- |
| 1 | 5000 | 1300 |
| 2 | 5000 | 2800 |
| 3 | 5600 | 4100 |

The mixture of 7 gr. EDA 11 gr. of adipicdihydrazide was utilized as the chain extender, the tensile strength was 7000 psi, and the modulus at 100% elongation was 2500 psi. Thus a tensile strength of 5000–7000 psi and a modulus at 100% elongation of about 2500–5000 psi are obtainable, and the combination of the hydrazine or hydrazide with the diamine showed at least a 25% improvement in tensile strength than with the hydrazine/hydrazide only.

EXAMPLE V

Succinic anhydride, 10 gr and glycerol, 9.2 gr were dissolved in 40 gr N-methyl pyrrolidone and reacted at 60° C. for 1 hour in the presence of 3 drops of dibutyltin dilaurate. Polyneopentane adipate (OH#=112), 100 gr, 4,4'di-(isocyanato cyclohexyl) methane, 84.5 gr, triethyl amine 10.1 gr and 50 gr N-methyl pyrrolidone were added. After 3 hours at 80° C. a prepolymer containing 3.15% free NCO was obtained. The prepolymer was dispersed in 405 gr of tap water and chain extended with 2.3 gr diethylenetriamine, 2.7 gr ethylenediamine and 5.8 gr adipic dihydrazide. A colloidal dispersion of 31.1% solids was obtained.

EXAMPLE VI

Hydroxyl terminated polyester (OH#=73) comprising hexane diol, isophthalic acid and adipic acid was melted at 60° C., and 2326.5 gr of it was charged into the reaction vessel. Dimethylol propionic acid 39.7 gr and 4,4' di-(isocyanato cyclohexyl) methane, 710.8 gr were added and stirred at 110° C. for 4 hours. A prepolymer containing 2.4% free NCO was obtained. A solution of emulsifier 248 gr (Igepal CO-730, GAF) and triethylamine, 30 gr, in 1800 gr water was prepared and added on top of the prepolymer. The mixture was agitated using a high shear mixer, and the resultant prepolymer emulsion was chain extended by hexamethylene diamine, 51.4 gr and adipic dihydrazide, 77 gr to give a 66% solids latex. A film cast from this solvent free urethane emulsion is flexible and thermoplastic (mp=200° C.). Into the final emulsion 3,6 and 9 phr of Cymel 373 (methoxy methylolated melamine—American Cyanamid Co.) were added. Films were cast and cured at 120° C. and at 160° C. for 10 minutes. At higher levels of Cymel 373 and particularly at higher temperatures the film were rendered thermosettic with virtually no discoloration. The effect of the crosslinker at various curing conditions on the mechanical properties of the polymer is demonstrated in Table I, below.

TABLE I

| Property | No Cross-Linking Agent | 3 phr | 6 phr | 9 phr |
|---|---|---|---|---|
| | 10 Min. at 120° C. | | | |
| Tensile Strength, psi Modulus at: | 4800 | 5400 | 4750 | 4100 |
| 100% Elongation, psi | 345 | 360 | 340 | 345 |
| 300% Elongation | 960 | 1200 | 1350 | 1280 |
| Ultimate Elongation, % | 575 | 575 | 490 | 475 |
| | 10 Min. at 160° C. | | | |
| Tensile Strength, psi Modulus at: | 4250 | 2300 | 2250 | 2300 |
| 100% Elongation, psi | 320 | 580 | 820 | 1050 |
| 300% Elongation | 860 | — | — | — |
| Ultimate Elongation, % | 645 | 240 | 180 | 165 |

What is claimed is:

1. A process for the preparation of thermal oxidation color stabilized cured anionic polyurethanes, comprising preparing a water dispersed polyurethane having pendant acid groups, said polyurethane being prepared from the reaction of a polyhydroxy polyol and a polyhydroxy polyol having a pendant carboxylic acid group, with a polyisocyanate, said acid groups having been neutralized with a volatile alkyl or alkanol tertiary amine which vaporizes at a temperature below about 150° C., said water dispersed anionic polyurethane being further treated with a hydrazide being an additive selected from the group consisting of monohydrazide and a polyhydrazide in an amount sufficient to impart thermal oxidation color stability to the polyurethane during curing, there being an absence of reactive NCO terminal groups when a polyhydrazide is selected and curing the polyurethane at a temperature of from about 150° C. to about 190° C. to provide a product which has thermal oxidation color stability.

2. The process of claim 1, wherein the hydrazide is one selected from the group consisting of a carbohydrazide, adipicdihydrazide and oxalyldihydrazide.

3. The process of claim 2, wherein the hydrazide is a carbohydrazide.

4. The process of claim 1, wherein curing is for a period of at least 10 minutes to about 60 minutes.

* * * * *